United States Patent [19]
Amada et al.

[11] Patent Number: 5,692,289
[45] Date of Patent: Dec. 2, 1997

[54] METHOD OF ASSEMBLING A MAGNETIC DISK DRIVE AND A SYSTEM THEREFOR

[75] Inventors: Hiroshi Amada, Naka-gun; Keisuke Yamaoka; Hiroshi Nagai, both of Odawara, all of Japan

[73] Assignee: Hitachi, Ltd., Tokyo, Japan

[21] Appl. No.: 472,458

[22] Filed: Jun. 7, 1995

[30] Foreign Application Priority Data

Jun. 10, 1994 [JP] Japan .................................. 6-128524

[51] Int. Cl.$^6$ .................................................. G11B 5/54
[52] U.S. Cl. ........................ 29/603.03; 29/759; 360/105
[58] Field of Search ..................... 29/603.03–603.05, 29/737, 759; 360/97.01, 98.02, 106, 107, 105

[56] References Cited

U.S. PATENT DOCUMENTS

| | | | |
|---|---|---|---|
| 5,027,242 | 6/1991 | Nishida et al. | 360/106 |
| 5,074,029 | 12/1991 | Brooks, Jr. et al. | 29/603.03 |
| 5,189,577 | 2/1993 | Nishida et al. | 360/106 |
| 5,341,260 | 8/1994 | Jabbari | 360/105 |
| 5,471,733 | 12/1995 | Bernett et al. | 29/603.03 |

FOREIGN PATENT DOCUMENTS

| | | |
|---|---|---|
| 63-167489 | 7/1988 | Japan . |
| 2-158982 | 6/1990 | Japan . |

*Primary Examiner*—Peter Vo
*Assistant Examiner*—Khan Nguyen
*Attorney, Agent, or Firm*—Fay, Sharpe, Beall, Fagan, Minnich & McKee

[57] ABSTRACT

A loading method and a system therefor for guiding a magnetic head onto a magnetic disk medium using a guiding jig. The guiding jig has a first guiding surface that is parallel to the recording surface of the magnetic disk medium when positioned next to the edge of the disk, and a second guiding surface that is inclined with respect to the first guiding surface. The magnetic head slides on the second guiding surface to the first guiding surface, and then onto the recording surface of the magnetic disk.

10 Claims, 6 Drawing Sheets

METHOD OF ASSEMBLING A MAGNETIC DISK DRIVE AND A SYSTEM THEREFOR

BACKGROUND OF THE INVENTION

1. Field of the Invention

The present invention relates to a simple and precise method of assembling a downsized large capacity magnetic disk drive and a system therefor, particularly for loading a magnetic head on a magnetic disk medium using a guiding jig without the magnetic head or magnetic disk being damaged.

2. Description of the Related Art

The external size of a magnetic disk drive is standardized depending on the radial dimension of the magnetic disk. The storage capacity is to be increased within the range of the standardized size. To respond to a request of a large capacity of a magnetic disk drive, it is important to mount as many magnetic disks as possible in the cabinet of the disk drive, which is of limited size under various restrictions.

Therefore, there is a tendency to reduce the thickness of each magnetic disk medium, the thickness of a spacer for keeping the interval between magnetic disk media, and the thickness of the magnetic head. A large capacity of a magnetic disk drive can be realized by realizing high precision of these relative positions.

A magnetic disk drive is disclosed in, for example, the specification of Japanese Patent Application Laid-Open Hei 02-158982 (hereinafter called the first disclosure). In the specification, a magnetic disk drive for mounting 7 magnetic disks is disclosed and the magnetic disks and magnetic head are mounted using an assembling jig having a shape that the thickness thereof decreases gradually toward the center of each magnetic disk. Japanese Patent Application Laid-Open Sho 63-167489 (hereinafter called the second dislcosure). In the specification, an expanding block is inserted between the magnetic heads and the magnetic heads are mounted on the magnetic disks by sliding the load arm in which the magnetic heads are loaded along the expanding block stopper.

When the spacing between magnetic disk media (hereinafter called disks) is decreased so as to increase the number of disks to be loaded, they cannot be assembled by the known technology.

For example, in the first disclosure, a magnetic head is loaded by using the assembling jig 12 shown in FIG. 11. In this case, when a magnetic disk drive is to be assembled in which the disk spacing is 1.7 mm, the number of disks is 4, the disk thickness 103 is 0.635 mm, and the thickness 102 including the magnetic head 5 and the suspension 9 shown in FIG. 8 is 0.732 mm, it is necessary that the total size 107 of the assembling jig 12 and two times of the size 102 including the magnetic head 5 and the plate spring is equal to the pitch of 2.335 mm of the magnetic disk 4 or less.

In this case, the thickness 106 of the assembling jig 12 is 0.871 mm or less. When the tolerance of height of the magnetic disk 4 inserted in the assembling jig 12 is 0.142 mm, the spacing between the inner surface of the U-shaped part of the assembling jig 12 and the disk is 0.047 mm which is a half of the net 0.094 mm obtained by subtracting the magnetic disk thickness and the tolerance of height thereof from 0.871 mm or less.

Under such conditions, in consideration of the tolerance of stacking assembly of the jig and the mounting accuracy, the spacing (structure of the U-shaped part) between the jig and the magnetic disk cannot be reserved.

In the second disclosure, the suspension 9 shown in FIG. 12 is clamped by the expanding block (finger) 13 and the magnetic head 5 is loaded on the magnetic disk 4.

In consideration of the stroke of the finger 13, that is, the lift amount of the magnetic disk 5, for example, when the spacing 101 of the magnetic disk 4 is 1.7 mm and the maximum size 102 of the magnetic head 5 and the suspension is 0.732 mm in FIG. 8, the lift amount of the finger 13 shown in FIG. 12 is 0.236 mm obtained by subtracting the maximum size 102 of the magnetic head and the suspension from the spacing 101 of the magnetic disk.

To keep the magnetic heads whose backs are positioned opposite to each other at the same magnetic disk spacing away from each other, it is necessary to set the lift amount of the finger 13 to 0.118 mm per head or less. Supposing that the tolerance of the thickness 105 of the plate spring (FIG. 12) is ±0.05 mm, it is necessary to set the lift amount of the finger 13 to 0.068 mm or less so as to keep the magnetic heads away from each other.

Supposing that the tolerance of the height 104 from the top of the magnetic disk 4 to the assembly reference 11 is ±0.071 mm in FIG. 9, the tolerance of the height 104 becomes larger than the lift amount of the finger 13. When the magnetic head is loaded in this state, the magnetic head 5 comes in contact with the end of the magnetic disk 4 and both of them are damaged.

When the height 104 from the top of the magnetic disk 4 to the assembly reference 11 is measured and the position of the finger 13 is adjusted, the height tolerance of the spindle 3 is canceled and only the tolerance of the magnetic disk 4 and the magnetic disk spacer 14 remain. For example, supposing that the maximum value of the tolerance of the spacer 14 is improved to ±0.051 mm, and when the discrepancy from the nominal height of the magnetic disk at the top is measured and the height of the finger is adjusted by a half of the discrepancy, the relative dislocation between the finger 13 and the magnetic disk 4 is improved up to 0.0255 mm.

On the other hand, supposing that the tolerance of the height 108 of the actuator 15 including the magnetic head 5 from the assembly reference 11 is ±0.069 mm, the relative dislocation with the finger 13 becomes ±0.0945 mm and exceeds the lift amount of the finger. As a result, an event that the magnetic head 5 cannot be lifted up is caused.

As mentioned above, it is impossible to assemble a large amount of magnetic disk drives under the condition that the magnetic disk spacing is 1.7 mm and the thickness of the magnetic head and plate spring is 0.732 mm by the conventional magnetic head loading method.

SUMMARY OF THE INVENTION

An object of the present invention is to solve the aforementioned problems and to provide a method of loading a magnetic head of a magnetic disk drive and to provide a system therefor for permitting a predetermined tolerance in an assembly of a magnetic disk and a magnetic head (HDA), and for decreasing the disk spacing further.

To accomplish the above object, the present invention includes a spindle for sustaining and rotating a plurality of magnetic disk media, a plurality of magnetic heads for recording/reproducing information on/from the magnetic disk media, an actuator for positioning the magnetic head at a selected position of the magnetic disk media in the radial direction, and a base for supporting the spindle and the actuator.

The present invention is a method of assembling a magnetic disk drive and a system therefor, wherein a magnetic head guiding jig is inserted from the outside of the magnetic disk drive so that the guiding surface is kept in parallel with the magnetic disk media so as to insert each of the magnetic heads on one of the magnetic disk media, and wherein the guiding jig approaches the side of the magnetic disk medium in the parallel state, is fixed so that the tapered part of the guiding surface of the guiding jig becomes thicker as the guiding jig approaches the side of the approached magnetic disk medium, and guides the magnetic disk head to the surface of the magnetic disk medium by sliding it on the guiding surface of the guiding jig.

More concretely, a method of supporting the guiding jig having a glass plate in a fixed state and in contact with a disk so as to load the actuator driven magnetic head on the disk, ensuring the reference position of the assembly, includes the steps of putting the magnetic head on the guiding jig having the glass plate, and loading the magnetic head by slowly moving the magnetic head and the disk, free from scratching. In this case, the thickness of the glass plate is set to at least the sum of the disk thickness and the height tolerance when the disk is stacked. The magnetic head insertion part of the glass plate is tapered so that the end face of the glass plate is lower than various heights of the magnetic head which is opened by the finger. The magnetic disk ejection part of the glass plate is chamfered more than the level difference between the disk and the glass plate and structured so as to protect the magnetic head from damage when the magnetic head slides at a low speed.

By doing this, the present invention has the following function and operation.

Since the magnetic head is put on the glass plate and loaded by sliding, it is not affected by the tolerance of mounting position of the magnetic head and the tolerance of thickness of the suspension of the magnetic head.

When the thickness of the glass plate is set to at least the sum of the disk thickness and the height tolerance when the disk is stacked, a shock applied to the magnetic head can be limited in the drop direction from the glass plate to the disk surface.

When the magnetic head insertion part of the glass plate is tapered, the magnetic head can be loaded on the glass plate free of damage when the magnetic head is within the tolerance of the mounting position.

When the magnetic disk ejection part of the glass plate is chamfered more than the level difference between the disk and the glass plate, and the magnetic head slides and moves at a low speed, the magnetic head can be loaded without the magnetic head and magnetic disk being scratched.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

Figure 1:
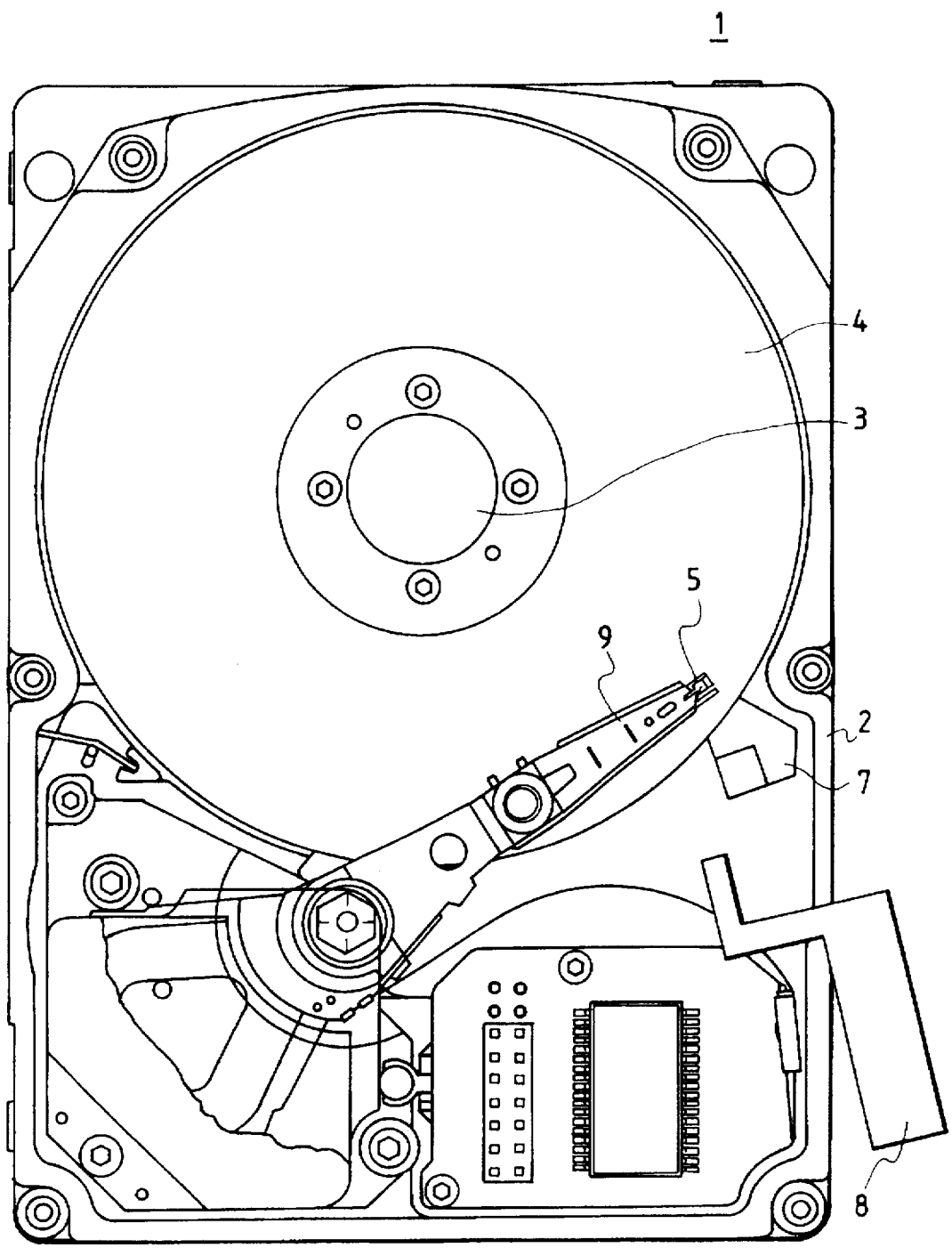
FIG. 1 is a top view of a magnetic disk drive showing a stacked glass plate block and a finger supported by the magnetic disk drive in a fixed state.

FIG. 1 is a top view of a magnetic disk drive 1 with the cover thereof removed.

Figure 2:
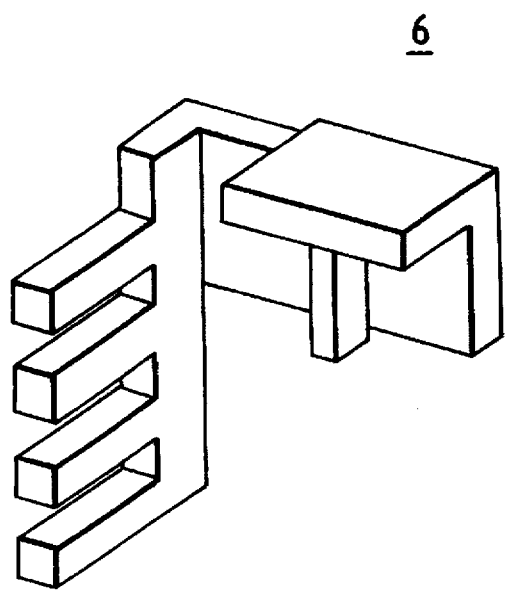
FIG. 2 is a perspective view for explaining a shipping comb.

There is a spindle 3 in a cabinet a, in which four magnetic disks 4 are stacked. A magnetic head 5 is supported by a spring 9 and the spring 9 is mounted on an actuator. Therefore, the magnetic head 5 moves by guidance by the actuator. Before loading, the magnetic head 5 is fixed at a position farther away from the magnetic disk 4 in the state that it is supported by the spring 9, and each tooth of a shipping comb 6 shown in FIG. 2 is inserted between each pair of opposite magnetic heads, so that the spacing between each pair of magnetic heads is within a certain fixed range.

For loading, the magnetic heads are inserted from the outside of the magnetic disk drive 1 as a pair of magnetic heads in the state that the shipping comb 6 is inserted and fixed temporarily before a finger 8 shown in FIG. 1 is inserted in the position indicated. The finger 8 comprises finger teeth each corresponding to a tooth is slightly thicker than the corresponding tooth of the shipping comb 6. FIG. 1 shows the glass plate stacked block 7 and the finger 8 positioned in the magnetic disk drive 1, indicating a status where the shipping comb 6 is removed from the position of the finger 8. Namely, when each tooth of the finger 8 is inserted into the spring 9 that supports the magnetic head 5 when set in the shipping comb 6, since the finger teeth are thicker than the teeth of the shipping comb 6, each pair of springs 9 (supporting paired magnetic heads 5) is opened and the shipping comb 6 is released from the magnetic head 5. Thus, the shipping comb 6 is removed from the magnetic disk drive 1.

Figure 5:
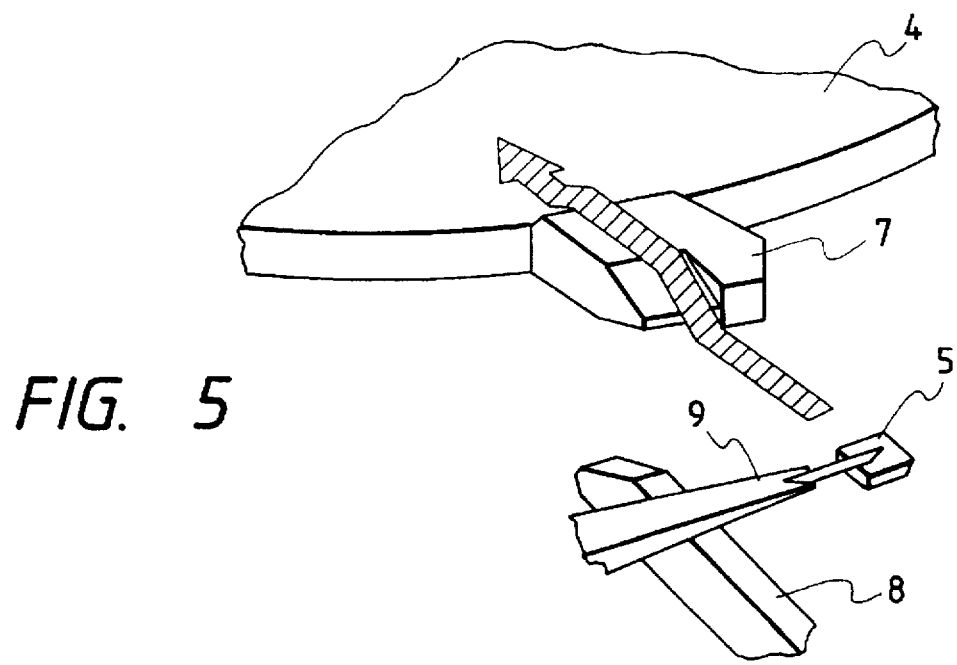
FIG. 5 is a perspective view for explaining loading of a magnetic head. The drawing shows a situation that the magnetic head is guided to the predetermined position by a finger.
Figure 6B:
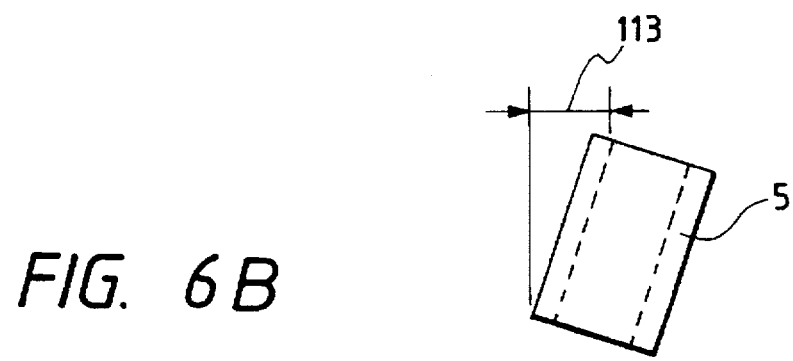
FIG. 6 is a side view for explaining loading of a magnetic head. The drawing shows the location relationship between a magnetic disk, the groove of a glass plate, and a magnetic head.
Figure 6A:
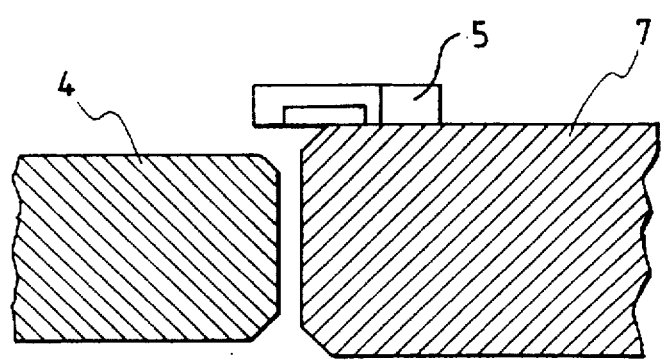

FIGS. 5 and 6A–6B show the process of implementing a magnetic head 5 on a magnetic disk 4 by further moving the finger 8. Namely, when the finger 8 further moves inside, the magnetic head 5 reaches the tapered part of the stacked glass plate block 7. When the magnetic head 5 approaches the magnetic disk 4 further, the suspension 9 is opened further by the tapered part of the glass plate stacked block (the plate thickness of the glass plate stacked block 7 is slightly greater than that of the finger 8) 7, so that the finger 8 is released from the suspension 9. In this state, the finger 8 is also removed.

Next, the stacked glass plate block 7 comes in contact with the side of the magnetic disk 4 and the magnetic head 5 is loaded on the magnetic disk 4 via the chamfered part of the glass plate.

Figure 3:
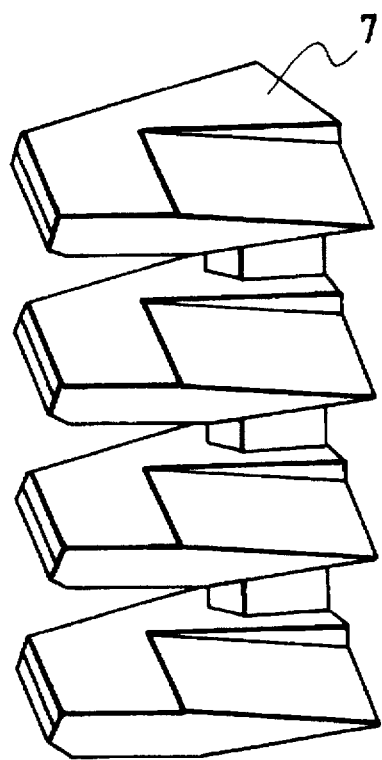
FIG. 3 is a perspective view for explaining a stacked glass plate block.
Figure 4:
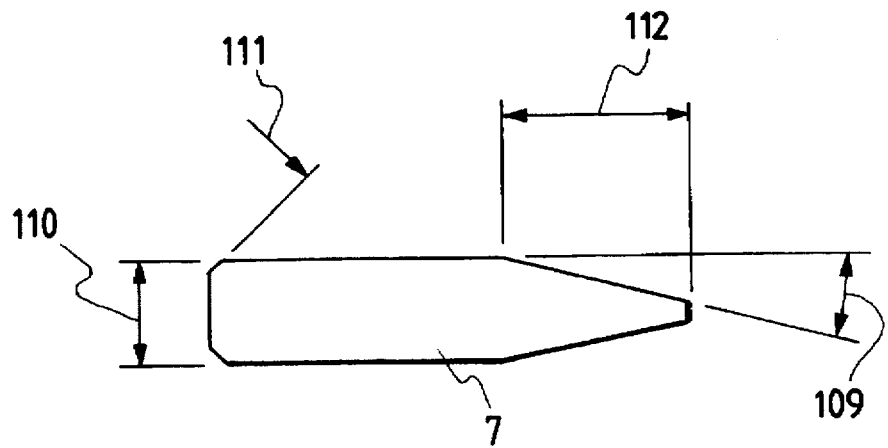
FIG. 4 is a cross sectional view for explaining the major dimensions of a stacked glass plate block.

The glass plate block 7 used for the loading method of the present invention is shown in FIGS. 3 and 4.

The thickness 110 of one glass plate of block 7 is set to 0.855 mm and four glass plates are stacked so that the height thereof is higher than the nominal height of the magnetic disk 4 by 0.11 mm. By doing this, for the tolerance of ±0.071 mm of the aforementioned height 104 (FIG. 9) of the magnetic disk 4 from the assembly reference, the magnetic head 5 which is loaded from the glass plate by sliding can be limited in motion in the drop direction for the magnetic disk 4.

To control a drop shock to the magnetic disk 4 at this time to 0.5 G or less, a chamfered part 111 (FIG. 4) is provided at the end face of the glass plate which comes in contact with the magnetic disk 4, and the magnetic head 5 slides along the chamfered part 111. There is a groove 113 generated by the magnetic disk 4 and the glass plate in the chamfered part 111 as shown in FIG. 6 and, when the groove 113 is equal to the width formed by the yawing angle of the rail of the magnetic head 5 or less, the magnetic head 5 moves slowly from the glass plate to the magnetic disk 4.

The width formed by the yawing angle of the rail of the magnetic head 5 in this embodiment is 0.949 mm and the sum of the maximum chamfer dimension (0.2 mm) of the end face of the magnetic disk 4, the tolerance of the outer diameter, and the variation of the outer diameter (0.20 mm) due to the concentricity between the stacked magnetic disks, is 0.405 mm, so that it is necessary to set the chamfer dimension of the glass plate to 0.544 mm or less.

In this embodiment, the sum of the maximum level difference between the magnetic disk 4 and the glass plate, that is, the tolerance of the magnetic disk 4 (±0.071) and the difference in thickness between the magnetic disk 4 and the glass plate (0.11 mm on one side) is 0.181 mm, so that when the chamfer dimension 111 is set to 0.2 mm and the moving speed of the magnetic head 5 at this time is set to 5 mm/s or less, it is ascertained that the drop shock of the magnetic disk 4 and the magnetic head 5 can be reduced to 0.5 G or less.

Figure 9:
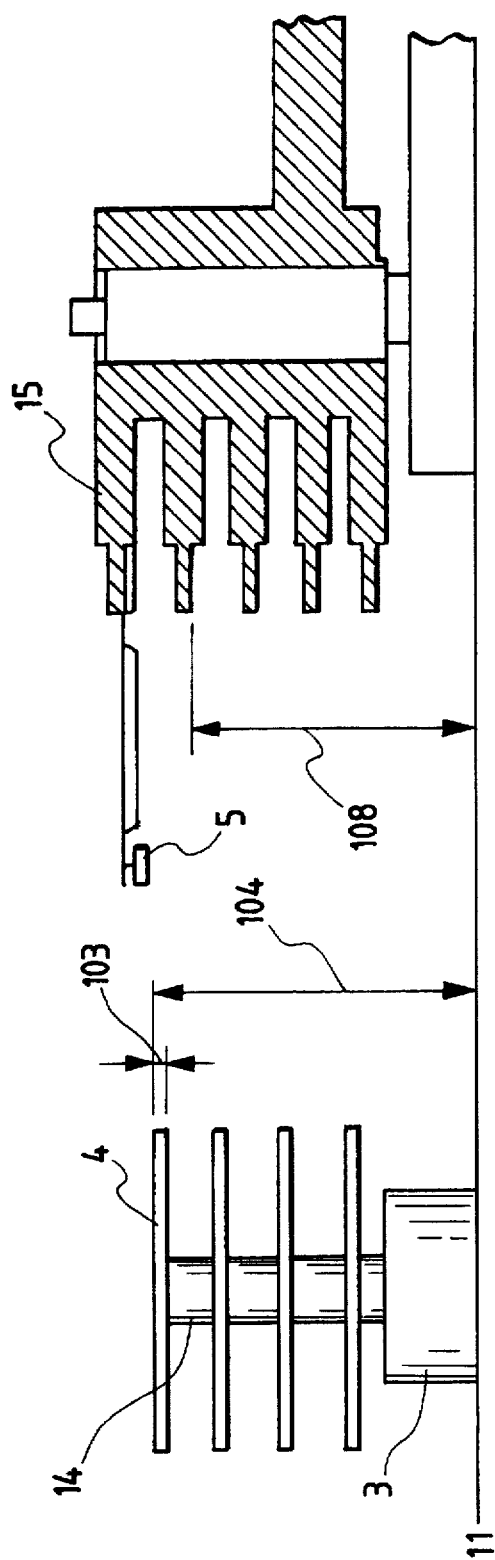
FIG. 9 is a side view for explaining the dimensions of a magnetic disk and a magnetic head from the assembly reference.
Figure 10:
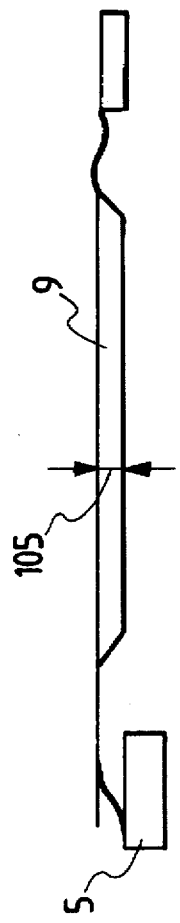
FIG. 10 is a side view for explaining the dimensions of a magnetic head and a plate spring.
Figure 11:
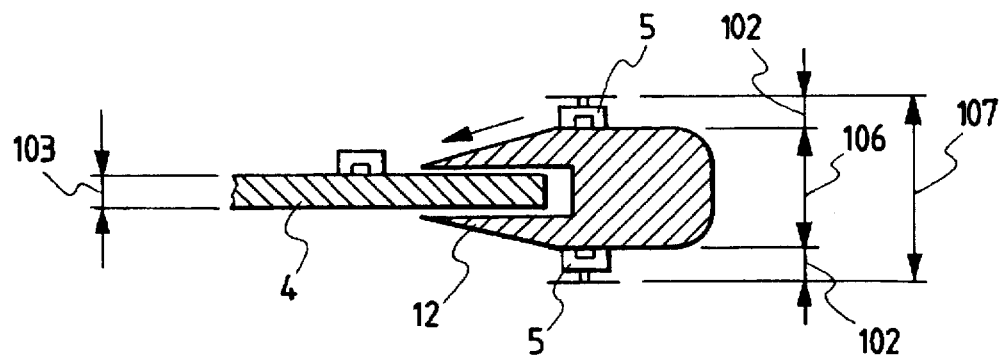
FIG. 11 is a side view for explaining a known disk drive assembly.
Figure 12:
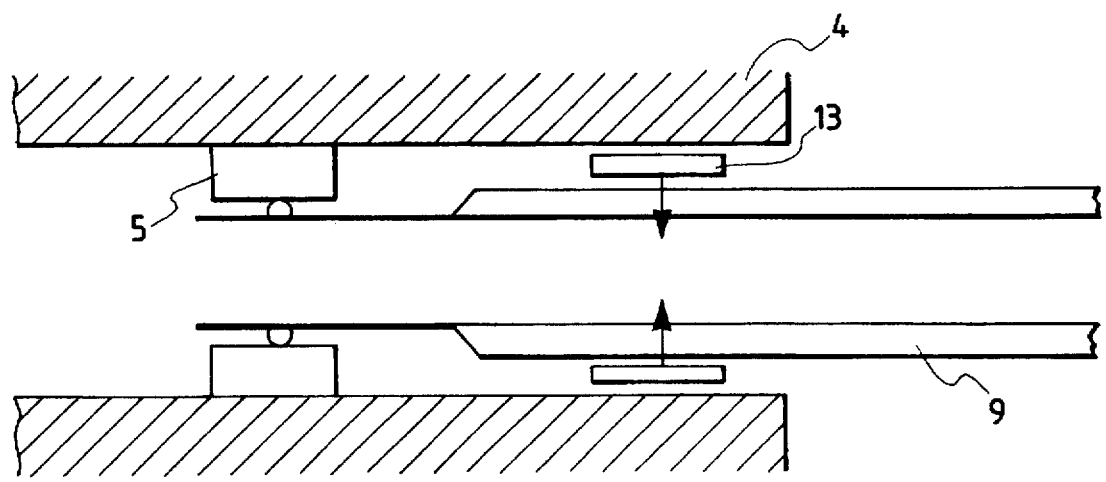
FIG. 12 is a side view for explaining another known disk drive assembly.

The glass plate of block 7 (FIG. 4) has a tapered part 109 on the side opposite to the magnetic disk, to absorb the tolerance ±0.069 mm of the height 108 of the magnetic head 5 from the assembly reference 11 shown in FIG. 9. The finger 8 shown in FIG. 5 sets the position of the magnetic head 5 at a distance of ±0.2 mm from the nominal height thereof. The taper angle 109 (FIG. 4) is set to 2.5° and the taper length 112 is set to 5 mm so that the tapered part 112 of the glass plate is positioned at a distance of 0.2 mm or less from the nominal height of the magnetic head 5. By doing this, the height tolerance of the magnetic head 5 can be canceled and the magnetic head 5 can be loaded on the glass plate of block 7. By executing such slide loading, the magnetic head 5 can be loaded on the magnetic disk 4 without the quality being impaired.

Figure 7:
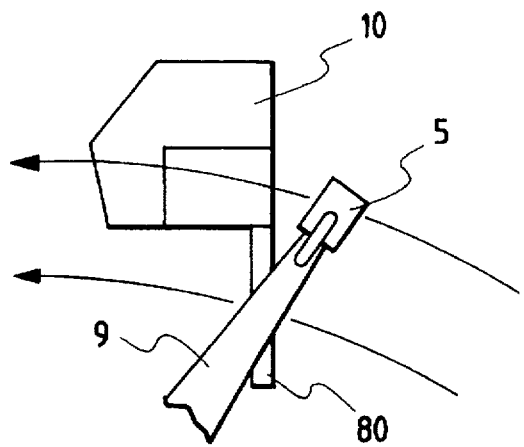
FIG. 7 is a top view for explaining a glass plate with a lift bar. A magnetic head can be transferred to the glass plate without using a finger.

Next, FIG. 7 shows an embodiment of another glass plate block 10, which guides the magnetic head 5 to the tapered part of the glass plate without using the finger 8. As shown in the drawing, the glass end face of the glass plate has a lift bar which functions as a finger, so that the magnetic disk drive is structured so as to load the magnetic head 5 on the glass plate without using the finger 8. By using the glass plate, the driving units for the assembling jig can be decreased in number and the operational man-hours can be reduced effectively.

Figure 8:
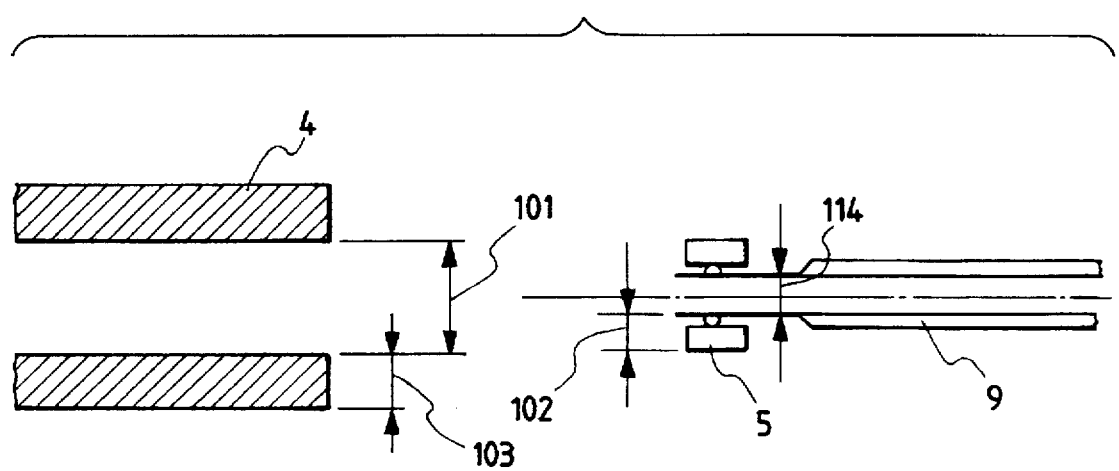
FIG. 8 is a side view for explaining the major dimensions of a magnetic disk and a magnetic head.

The back spacing 114 between the magnetic heads 5 shown in FIG. 8 is 0.236 mm in nominal size. The back spacing 114 can be shortened further by 0.2 mm, so that the magnetic disk spacing can be set to 1.5 mm by the method of the present invention.

As to loading in the case of the tolerance of size of a magnetic head and/or a magnetic disk which cannot use the present method, it is necessary to measure the height of each surface of the stacked magnetic disks once again and correct the position of the glass plate block, so that a more expensive facility is necessary.

By using the method of the present invention, a method of assembling a magnetic disk drive (loading method) and a system therefor having a narrow minimum disk spacing which is decided only by the thickness tolerance of two magnetic heads and the height tolerance of magnetic disks due to part accuracy can be realized by a facility which is comparatively inexpensive.

The present is explained above concretely on the basis of the preferred embodiments. However, the present invention is not limited to the aforementioned embodiments, but can be changed variously so long as the substance is not deviated.

By doing this, a magnetic disk drive in which the disk spacing is 1.7 mm or less and the back spacing between magnetic heads on the same disk is 0.236 mm or less can be assembled.

What is claimed is:

1. A method of assembling a magnetic disk drive including a spindle for sustaining and rotating a magnetic disk medium, a magnetic head for recording/reproducing information on/from said magnetic disk medium, an actuator for positioning said magnetic head at selected position with respect to said magnetic disk medium in the radial direction, and a base for supporting said spindle and said actuator, comprising the following steps:

inserting a magnetic head guiding jig into said magnetic disk drive, said guiding jig having a first guiding surface and a tapered part having a second guiding surface that is inclined to meet said first guiding surface;

positioning said guiding jig adjacent to a nonrecording edge of said magnetic disk medium so that the first guiding surface is parallel with a recording surface of said magnetic disk medium and between said recording surface and said second guiding surface; and guiding said magnetic head to the recording surface of said magnetic disk medium by sliding the magnetic head on the second guiding surface and then on the first guiding surface of said guiding jig.

2. A method of assembling a magnetic disk drive according to claim 1, wherein said guiding step includes a step of putting and moving said magnetic head on a finger so as to guide said magnetic head to said second guiding surface.

3. A method of assembling a magnetic disk drive according to claim 1, further comprising:

a step of removing said guiding jig from said magnetic disk drive after said magnetic head is guided to the recording surface of said magnetic disk medium.

4. A method of assembling a magnetic disk drive according to claim 1, wherein said guiding jig includes a glass plate having said first and second guiding surfaces.

5. A method of assembling a magnetic disk drive according to claim 1, wherein said magnetic disk drive includes a plurality of magnetic disk media and a plurality of magnetic heads for recording/reproducing information on/from said magnetic disk media;

wherein said actuator positions each of said magnetic heads at a selected position with respect to said magnetic disk media in the radial direction;

wherein said guiding jig has a plurality of said first and second guiding surfaces, each of said plurality of first guiding surfaces being kept in parallel with the respective recording surfaces of said magnetic disk media; and wherein said guiding step is performed so as to guide said magnetic disk heads to the recording surfaces of said magnetic disk media by sliding the magnetic heads to the recording surfaces on a respective one of the second guiding surfaces and on a respective one of the first guiding surfaces of said guiding jig.

6. A method of assembling a magnetic disk drive according to claim 5, wherein said guiding step includes a step of putting and moving said magnetic heads on a finger so as to guide said magnetic heads to said respective second guiding surfaces.

7. A method of assembling a magnetic disk drive according to claim 5, further comprising:

a step of removing said guiding jig from said magnetic disk drive after said magnetic heads are guided to the recording surfaces of said magnetic disk media.

8. A method of assembling a magnetic disk drive according to claim 5, wherein said guiding jig is a stacked glass plate block.

9. A system for assembling a magnetic disk drive having a spindle for sustaining and rotating a plurality of magnetic disk media, a magnetic head for recording/reproducing information on/from said magnetic disk medium, an actuator for positioning said magnetic head at a selected position with respect to said magnetic disk medium in the radial direction, and a base for supporting said spindle and said actuator, wherein said system comprises:

a magnetic head guiding jig inserted into said magnetic disk drive, said guiding jig having a first guiding surface and a tapered part having a second guiding surface that is inclined to meet said first guiding surface; and means for positioning said guiding jig adjacent a nonrecording edge of said magnetic disk medium so that the first guiding surface is parallel with a recording surface of said magnetic disk medium and between said recording surface and said second guiding surface.

10. A system for assembling a magnetic disk drive according to claim 9, wherein said magnetic disk drive has a plurality of magnetic disk media sustained and rotated by said spindle, and a plurality of magnetic heads for recording/reproducing information on/from said magnetic disk media;

wherein said actuator positions said magnetic heads at selected positions with respect to said magnetic disk media in the radial direction; and wherein said guiding jig has a plurality of said first and second guiding surfaces, each of said plurality of magnetic heads being guided on a respective one of said second guiding surfaces and on a respective one of said first guiding surfaces to a respective magnetic disk medium recording surface, each of said plurality of first guiding surfaces being kept in parallel with respective recording surfaces of said magnetic disk media so as to position said magnetic heads on said magnetic disk media.

* * * * *